(12) United States Patent
Sielaff et al.

(10) Patent No.: US 9,704,004 B1
(45) Date of Patent: Jul. 11, 2017

(54) SYSTEMS AND METHODS OF REAL-TIME ASSIGNMENT OF ITEMS TO PREREGISTERED INDIVIDUALS

(71) Applicant: TEMPO TICKETS, LLC, Minneapolis, MN (US)

(72) Inventors: Mark B. Sielaff, Minneapolis, MN (US); Nicholas L. McCulloch, Brooklyn Park, MN (US)

(73) Assignee: TEMPO TICKETS, LLC, Minneapolis, MN (US)

( * ) Notice: Subject to any disclaimer, the term of this patent is extended or adjusted under 35 U.S.C. 154(b) by 0 days.

(21) Appl. No.: 14/989,942

(22) Filed: Jan. 7, 2016

Related U.S. Application Data

(60) Provisional application No. 62/101,535, filed on Jan. 9, 2015.

(51) Int. Cl.
*G06F 17/00* (2006.01)
*G06K 7/10* (2006.01)

(52) U.S. Cl.
CPC .................. *G06K 7/10376* (2013.01)

(58) Field of Classification Search
CPC .......... G06F 17/00; G06F 7/00; G06K 19/00; G06K 7/10; G06K 9/22
USPC .............. 235/375, 487, 462.45, 472.02, 376
See application file for complete search history.

(56) References Cited

U.S. PATENT DOCUMENTS

| | | | | |
|---|---|---|---|---|
| 2004/0100566 A1* | 5/2004 | Valleriano | ................ | G07C 1/22 348/231.99 |
| 2008/0316032 A1* | 12/2008 | Kia | .................... | A63B 24/0021 340/572.1 |
| 2012/0025944 A1* | 2/2012 | Hansen | .................... | G07C 1/24 340/3.21 |
| 2013/0231760 A1* | 9/2013 | Rosen | .................... | G06F 17/40 700/91 |
| 2014/0002663 A1* | 1/2014 | Garland | ................ | H04N 7/188 348/159 |
| 2014/0172474 A1* | 6/2014 | Partridge | ................ | G06Q 10/02 705/5 |
| 2014/0337434 A1* | 11/2014 | Hansen | .................. | G06Q 50/10 709/204 |
| 2015/0302235 A1* | 10/2015 | Kelly | ................. | G06K 7/10425 340/10.1 |
| 2016/0132588 A1* | 5/2016 | Duncan | ............. | G06F 17/30604 235/462.01 |

OTHER PUBLICATIONS

"Tempo Events: Game Changing Technology Solution for Race Directors", Power Point Presentation, publically disclosed prior to Jan. 9, 2015; 15 pages.

* cited by examiner

*Primary Examiner* — Edwyn Labaze
(74) *Attorney, Agent, or Firm* — Hamre, Schumann, Mueller & Larson, P. C.

(57) ABSTRACT

Systems and methods of assigning an RFID chip and/or a participant number to an event participant who has preregistered for the event. The assignment of the RFID chip and/or participant number to the participant occurs in real-time while the event participant or a designated representative thereof is present at a designated pick-up location to pick up the RFID chip and/or participant number.

7 Claims, 4 Drawing Sheets

SYSTEMS AND METHODS OF REAL-TIME ASSIGNMENT OF ITEMS TO PREREGISTERED INDIVIDUALS

FIELD

This disclosure relates to systems and methods of real-time assigning of an item, such as, but not limited to, an RFID chip and/or a participant number, to a preregistered individual using a mobile device while the individual is present at the location at which the item is to be assigned.

BACKGROUND

RFID chips are often assigned and issued to participants in events to time, identify, and/or track the participants in the events. A single RFID chip could be assigned and issued to a single participant or to a group of participants. Examples of events that assign and issue RFID chips to participants include, but are not limited to, running events such as marathons, half marathons, 5k runs and the like, duathlons, triathlons, bicycle races/rides, and other events. Each RFID chip stores a unique identifier and optionally other data. Readers are capable of communicating with the RFID chips and reading the unique identifier of each chip.

RFID chips and readers use Radio Frequency (RF) waves to communicate. Recent advances in electronics have made it possible to manufacture RFID chips that have no power source of their own. These RFID chips, usually referred to as passive chips, harvest all of their power from the incident RF wave. They modulate and partially reflect the RF wave to communicate with readers. Passive RFID chips are relatively inexpensive to manufacture and can be used as disposable RFID chips.

Each event participant carries the assigned RFID chip embedded in a wrist band or ankle strap worn by the participant, attached to one of their shoes, attached to an assigned bib that is worn by the participant, attached to their bicycle, or the like. In some events, an RFID reader reads the RFID chip at the start line and at the finish line, and optionally at one or more additional locations between the start and finish. For each read operation, the unique identifier of the RFID chip and a time stamp is recorded. These records are used to calculate an event completion time for each participant, track each participant's progress through the event, and the like.

For some events, the participants are usually required to register with the event organizer prior to the start of the event. The event organizer typically assigns a unique identification number to each participant. This unique number is often referred to as the "race number" which is used to uniquely identify the participants before, during, and after the race. For some events, the race number may be printed or otherwise provided on a "race bib" which is worn by the participants during the event. The race number is typically assigned after the participant registers and before the participant picks up their race bib.

When RFID systems are used in an event, it is necessary to establish a relation between the event registrant, the unique identifier of the RFID chip for the registrant, and the race number of the registrant. Currently, establishing such relation is labor intensive and error prone. The process typically involves manually entering the chip number for each registered participant into a computer program and assuring that the correct RFID chip is delivered to each participant along with the race bibs.

SUMMARY

Systems and methods are described of assigning an RFID chip to an event participant who has preregistered for the event. The assignment of the RFID chip to the participant occurs in real-time while the event participant or a designated representative thereof is present at a designated pick-up location to pick up the RFID chip.

In some embodiments, in addition to assigning the RFID chip, a participant number, for example a race number, on a bib, for example a race bib, is also assigned to the participant in real-time while the event participant is present at the designated pick-up location. In some embodiments, the RFID chip and the participant number can be assigned simultaneously or separately from each other. In some embodiments, only the RFID chip is assigned, or only the participant number is assigned.

In some embodiments, part of the assignment process can include reading data from the RFID chip directly, for example reading a unique identifier or chip number stored on the RFID chip, by using radio frequency communication with the RFID chip. In other embodiments, part of the assignment process can include indirectly reading the RFID chip, for example by optically reading a code, uniquely associated with the RFID chip, that is provided on the outside of the RFID chip or by optically reading a code, uniquely associated with the RFID chip, that is present on the surface of a structure, such as a bib, on which the RFID chip is mounted. In still other embodiments, part of the assignment process can include manually entering the code, the unique chip identifier, or any other data, to assign the RFID chip.

In the case of the participant number, part of the assignment process can include manually entering the participant number or reading a code, such as a 1 dimensional or 2 dimensional bar code, associated with a bib on which the participant number is disposed.

The concepts described herein can be used in any event for which an RFID chip and/or a participant number is to be assigned and issued to a registered participant. Examples of events include, but are not limited to, running events such as marathons, half marathons, 5k runs and the like, duathlons, triathlons, bicycle races/rides, and other events including non-sporting events.

The concepts described herein can also be used in any application where an individual pre-registers for an activity online, and the individual is then assigned a unique identifier in real-time when the individual shows up at a designated location after registering.

In some embodiments, the concepts described herein can be utilized with other devices that are commonly carried by the preregistered individual. Instead of assigning an RFID chip to the preregistered individual, a mobile phone, a smart watch, or other item carried by the preregistered individual that has communication capability can be assigned to the preregistered individual in real-time at a designated location, such as the location where RFID chips are also being assigned. A mobile device, or a reader that is connected to or that is physically integrated into a mobile device, at the designated location reads a unique identifier of the mobile phone, smart watch, or other device, and then associates that unique identifier with the individual's registration details. The individual then carries the device during the event, with the device functioning generally similarly to an RFID chip by allowing the individual's location in the event to be tracked via the device.

DRAWINGS

FIG. 1 schematically illustrates a system by which a participant registers for an event for which an RFID chip will be issued to the registered participant.

FIG. 2 schematically illustrates a system by which the RFID chip is assigned to the registered participant in real-time.

DETAILED DESCRIPTION

Figure 1:
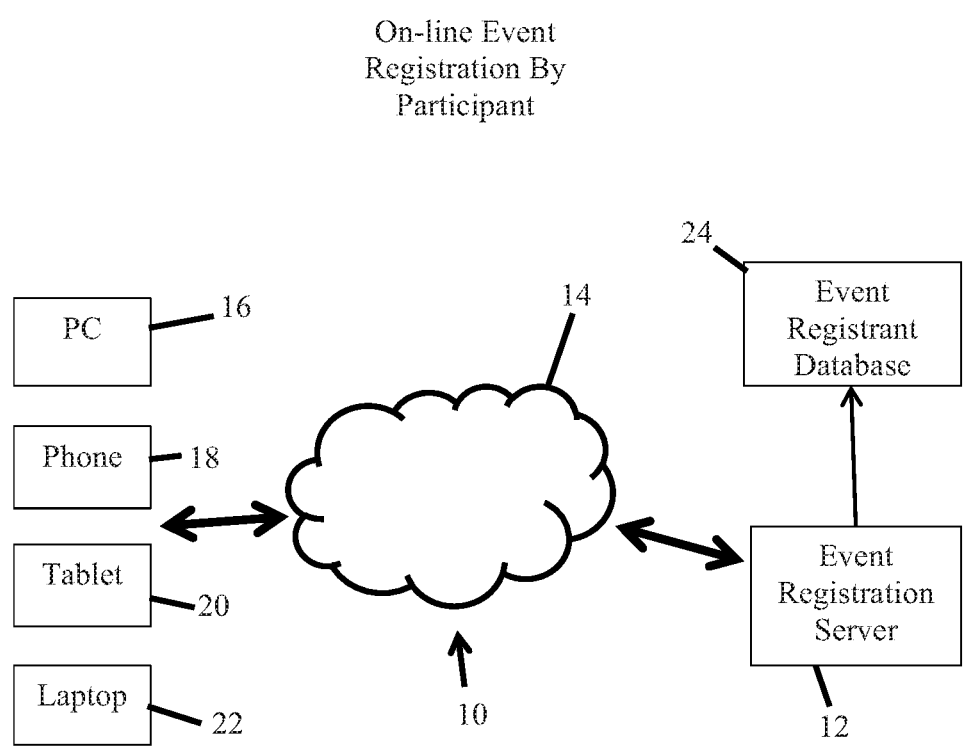

The following description describes systems and methods of assigning an RFID chip and/or a participant number to an event participant who has preregistered for the event. The assignment of the RFID chip and/or participant number to the registered participant occurs in real-time while the registered participant or a designated representative is present at a designated pick-up location to pick up the RFID chip and/or participant number. Once assigned, the assigned RFID chip and/or participant number is then issued.

As used herein, a registered participant, or just participant, is someone who has previously registered for an event for which an RFID chip and/or a participant number is to be issued to the registered participant.

To issue the assigned RFID chip and/or participant number to the registered participant includes both giving the assigned RFID chip and/or participant number directly to the registered participant and giving the RFID chip and/or participant number to a designated representative of the registered participant.

Assignment of the RFID chip and/or participant number to the registered participant is intended to encompass any means of matching data previously entered by the registered participant during a registration process with data that uniquely identifies the RFID chip and/or participant number so that the RFID chip and/or participant number become associated with the registered participant prior to and during the event for which the RFID chip and/or participant number are being issued.

Assignment of the RFID chip and/or participant number to the registered participant in real-time means that the assignment of the RFID chip and/or participant number occurs while the registered participant or a designated representative thereof is at a designated location to pick-up the RFID chip and/or participant number, and assignment occurs after the participant or designated representative has arrived at the designated location and immediately before issuing the RFID chip and/or participant number to the registered participant or the designated representative.

In some embodiments, the RFID chip and/or participant number may be given to the registered participant at a first station at the pick-up location, and at a second, separate station, a volunteer looks up the registered participant and then scans the RFID chip and/or the participant number the participant was given at the first station in order to assign the RFID chip and/or participant number. So the issuance of the RFID chip and/or participant number to the participant can occur before the RFID chip and/or participant number is actually assigned to the participant.

The event can be any event for which an RFID chip and/or participant number are to be assigned and issued to a registered participant. Examples of events include, but are not limited to, running events such as marathons, half marathons, 5k runs and the like, duathlons, triathlons, bicycle races/rides, and other events including non-sporting events.

The RFID chip can have any configuration allowing it to be worn by the registered participant or mounted to an apparatus, such as a bicycle, used by the registered participant during the event. For example, the RFID chip can be mounted on a bib, sometimes referred to as a race bib in running events, that in turn is worn by the participant, the RFID chip can be designed to be attached to one of the participant's shoes, the RFID chip can be embedded in a wrist band or ankle strap worn by the participant, and the like.

A mobile device described herein that is used during assignment of the RFID chip and/or participant number to the participant can be any device that is relatively easily portable, relatively lightweight, powered by one or more rechargeable batteries, has a display screen, has data input capability for example via a touchscreen displayed on the display screen or via a physical keypad, can have a camera function for capturing images, and has suitable connectivity capability, for example via a wireless communication technology such as WiFi or other, with a remote database over a network such as the Internet. In some embodiments, the mobile device may also have a USB port or other suitable connection port to allow connection of peripheral devices, for example an RFID chip reader. In other embodiments, an RFID chip reader can be physically integrated into the mobile device. Examples of mobile devices that can be used include, but are not limited to, tablet devices including Android-based tablets such as the Samsung Galaxy tablets, Google Nexus 7, Amazon Kindle Fire, or iOS-based tablets such as the Apple iPad. In some embodiments, the mobile devices may be mobile phones, whether Android-based, iOS-based, or other operating system based.

Referring now to FIG. 1, an example of a system 10 by which a participant registers for an event for which an RFID chip and/or participant number will be issued to the registered participant is illustrated. The system 10 includes an event registration server 12 that is accessible via a network 14 such as the Internet. The server 12 can be accessed by a participant wishing to register for an event using any suitable user device that can access the server 12 via the network 14 and through which the participant can register for the event. Examples of user devices that can be used to register for the event include, but are not limited to, a personal computer 16, a mobile phone 18, a tablet device 20 or a laptop computer 22.

The server 12 is designed to make available for display on the user device 16-22 an event registration website with one or more event registration pages that permit the participant to register for the event. The event registration page(s) preferably collects information on the participant that can include, but is not limited to, at least some of the following: the participant's name, address, e-mail address, age, shirt size, payment information such as credit card information, and other information commonly collected during event registrations. The entered information is saved in an event registrant database 24 that stores the participant data and allows later retrieval of the participant data.

In addition, in some embodiments discussed further below, a participant code can be assigned to the participant and provided to the participant. The assigned participant code is saved together with the entered participant data in the database 24. The participant is expected to bring the assigned participant code with them to a designated location to pick-up an RFID chip, participant bib, and other materials. The participant code is then used by personnel at the designated location to access the participant's information in the event registration database for the purposes of real-time assigning of the RFID chip and/or participant number to the participant at the pick-up location. However, in other embodiments, for example where the participant forgets to bring the assigned participant code, the participant's information in the database can be accessed by entering the participant's name or other information.

The participant code can be assigned to the participant at any time during or after completion of the registration process. In one embodiment, the server 12 assigns the participant code once all required participant information has been entered. In other embodiments, the participant code can be assigned after registration is completed and after the participant has logged off from the registration website.

In some embodiments, the participant code can provided to the participant by displaying the participant code on the website during and/or immediately after completion of the registration process, and the participant can then either print the participant code or write the code down. In other embodiments, the participant code can be provided to the participant in other ways, for example by e-mail, by postal mail, by text message, by another website that the participant can access, and other means.

The assigned participant code can be a 1D or 2D bar code, a set of numbers and/or letters, or any means for uniquely identifying each participant.

Figure 2:
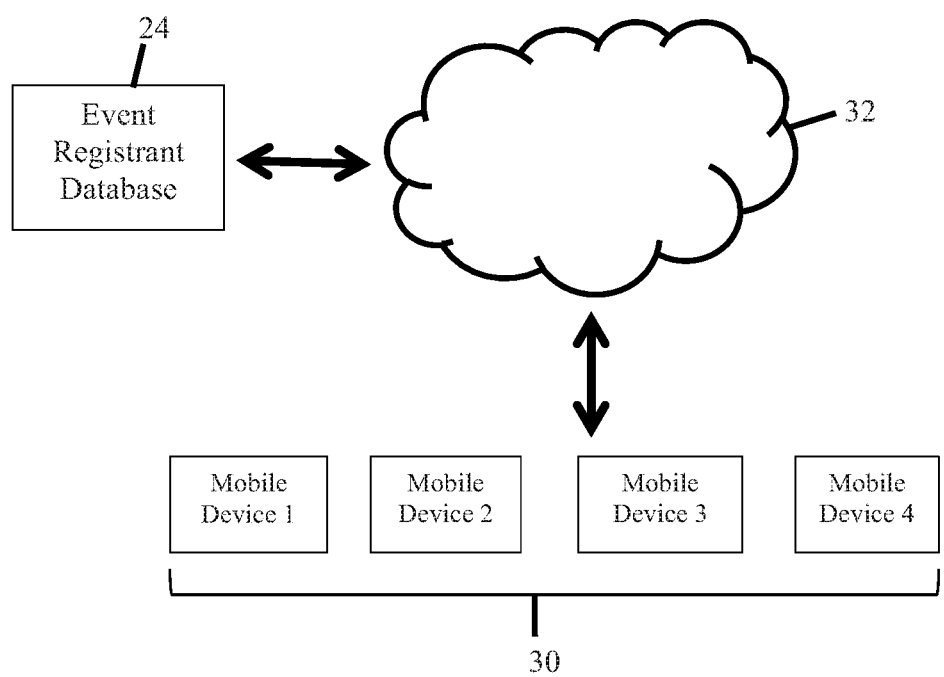

Referring now to FIG. 2, the RFID chip pick-up location (often called packet pick-up) is illustrated. This is the location where the participant or designated representative picks-up an RFID chip, participant bib, and possibly other materials for the event. Currently, for most running events, a race packet containing an RFID chip and a participant bib with a participant or race number disposed on the bib, each of which has been assigned to the participant prior to the participant arriving at packet pick-up, would be issued to the participant. This assembling of the race packets, including pre-assigning of the RFID chip and the bib to the participant, prior to packet pick-up is very time consuming and prone to errors.

Instead of pre-assigning the RFID chip to the participant, the RFID chip and optionally the bib, are assigned to the participant in real-time while the participant is at packet pick-up. For most events, packet pick-up is staffed by volunteers with little or no formal training and so systems and methods that are easy to implement in assigning the RFID chip and/or participant number is important.

As shown in FIG. 2, in one embodiment, the volunteers at packet pick-up are provided with a plurality of mobile devices 30 that the volunteers use to assign an RFID chip and/or participant number which in some embodiments is disposed on a bib, to the participant while the participant or designated representative is present. Each of the mobile devices 30 can communicate with the event registration database 24 via a network 32 such as the Internet using a suitable connection such as WiFi.

In one embodiment, each of the mobile devices 30 mirrors the event registration database 24 so that each mobile device 30 contains copies of the data in the database 24, for example each mobile device 30 contains some or all of the data for each registered participant for the event. In one embodiment, the database 24 and the mobile devices 30 undergo automatic, simultaneous updating of the data contained therein on a periodic basis such as every 10 to 15 seconds or the like. Therefore, as data contained in the database 24 changes, and likewise as data in the mobile devices 30 is updated, those updates are communicated in real-time to one another.

The participant brings their assigned participant code to packet pick-up. The volunteer then uses the participant code to access the participant's registration details on the mobile device 30. In the case of the participant code being a bar code, the volunteer can use a bar code reader application on the mobile device 30 to read the bar code. When the bar code is read, the participant's registration details are automatically retrieved and displayed on the display of the mobile device 30. In the case of the participant code being numbers and/or letters, the code can be manually entered via the mobile device 30 or optically read by the mobile device 30 in order to retrieve the registration details. When the participant does not bring their assigned participant code, the registration details may be retrieved by manually entering the participant's name or other information into the mobile device 30.

Once the participant's registration details are retrieved, the RFID chip is then assigned to the participant. Assignment of the RFID chip can be performed in any suitable manner.

For example, in one embodiment, the mobile device 30 can read the unique RFID chip identifier, and once read add the unique chip identifier to the registrant database 24 so that the RFID chip is assigned to the participant. Reading of the unique chip identifier can occur optically, for example by using the mobile device 30 to read a bar code on the RFID chip that corresponds to, or is otherwise tied to, the unique chip identifier. Reading of the unique chip identifier may also occur magnetically by using a magnetic chip reading device that is integrated into or interfaced with the mobile device 30 to magnetically read the unique chip identifier from the RFID chip. Reading of the unique chip identifier may also occur directly by using radio frequency communications and an RFID reader physically integrated into or interfaced (wirelessly or by one or more wires) with the mobile device.

It is also possible to indirectly read the unique RFID chip identifier. For example, in some designs, the RFID chip is mounted directly on the bib containing a participant number, in which case the unique RFID chip identifier may already be associated with the participant number or other code on the bib. Therefore, the unique RFID chip identifier could be read by optically reading the participant number or other code on the bib using the mobile device 30. Not only could this embodiment be used to assign the RFID chip to the participant, but at the same time the participant number on the bib could be assigned to the participant.

In addition to, or separately from, assigning the RFID chip to the participant, the participant number may also be assigned to the participant in real-time at packet pick-up. For example, the participant number can be assigned to the participant by optically reading the participant number or other code on the bib using the mobile device 30 and once read add the participant number to the registrant database so that the participant number is assigned to the participant. The participant number may also be manually entered into the mobile device or entered using speech recognition technology into the mobile device and associated with the participant in the registrant database. When speech recognition technology is used, the volunteer or other person can audibly speak the participant number which is recognized by the speech recognition technology and then automatically entered into the database.

Figure 3:
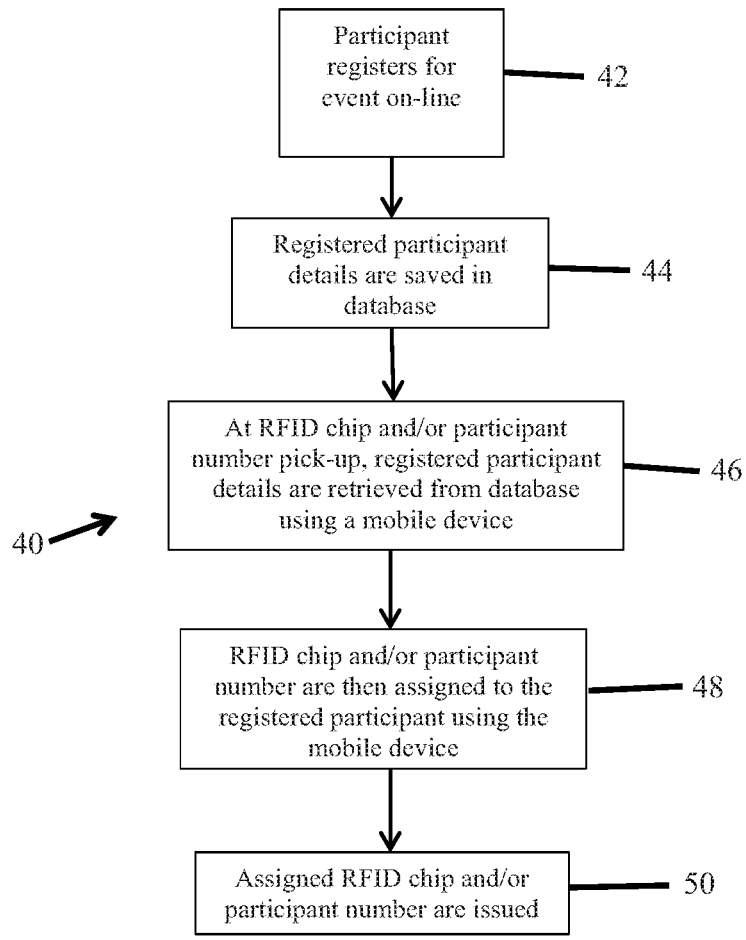
FIG. 3 illustrates an example of a method for assigning the RFID chip to a registered participant in real-time.

FIG. 3 illustrates one example of a method 40 for assigning the RFID chip to a registered participant in real-time. The method 40 begins by the participant registering for the event on-line at 42, for example as discussed above for FIG. 1. The registered participant details are saved in the event registration database 24 at 44.

At some point in time after registering, the participant or designated representative arrives at a designated pick-up location at which RFID chips are to be distributed to the event participants perhaps even along with a bib containing a participant number. The RFID chip pick-up could be days, weeks, or months after registration occurs. At the pick-up location, the registered participant details are retrieved from the database 24 by a volunteer using the mobile device 30 at 46. As discussed above and further below in FIG. 4, retrieval of the participant details could occur by using the mobile device to read an assigned participant code to automatically retrieve the participant details, or by manually entering data such as the participant code or the participant's name or other information via the mobile device 30.

The RFID chip and/or the bib with the participant number are then assigned to the registered participant using the mobile device at 48. Assignment occurs by entering the unique chip identifier and/or the participant number and/or any other identifier(s) into the participant's information in the database 24. In one embodiment, for each participant, one or more fields can be provided in the database 24 in which the unique chip identifier and/or the participant number and/or any other identifier(s) can be entered and saved.

Once the RFID chip and/or the bib with the participant number are assigned, the RFID chip and/or the race bib can then be issued at 50. Issuance can be directly to the registered participant. Some events permit designated representatives to pick-up materials for other registered participants, in which case issuance can be to a designated representative of the participant.

Figure 4:
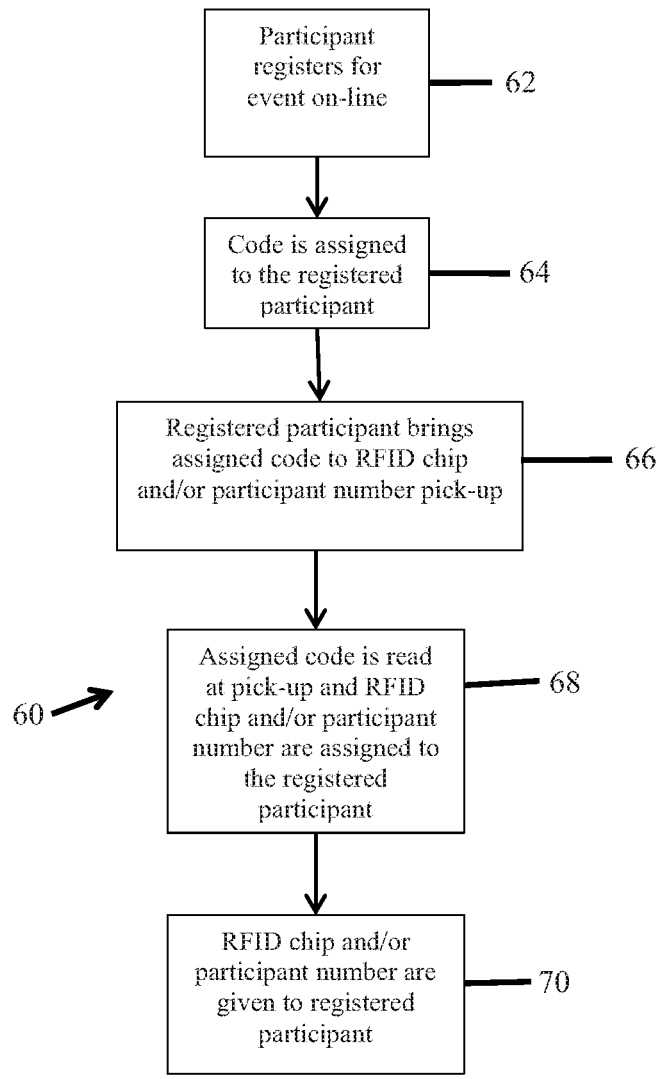
FIG. 4 illustrates another example of a method for assigning the RFID chip to a registered participant in real-time.

FIG. 4 illustrates another example of a method 60 for assigning the RFID chip and/or participant number to a registered participant in real-time. The method 60 begins by the participant registering for the event on-line at 62, for example as discussed above for FIG. 1. The registered participant details are saved in the event registration database 24.

During or after registration occurs, a participant code is assigned to the participant at 64 and provided to the participant. For example, as explained above, the participant code can be assigned at the conclusion of the registration process and displayed to the participant on the web page. The participant code could also be sent by e-mail, postal mail, text message, or any other of means of making the participant code available to the participant.

At some point in time after registering, the participant or designated representative arrives at a designated pick-up location at which RFID chips are to be distributed to the event participants perhaps even along with a bib containing the participant number. The pick-up could be days, weeks, or months after registration occurs. In this embodiment, the participant would be instructed to bring the assigned participant code to the pick-up at 66. The participant code could be printed out and brought to the pick-up location. The code could also be brought to pick-up on the user's mobile device, such as their mobile phone.

At 68, the assigned participant code is read at the pick-up location and based on the reading, the RFID chip and/or participant number are assigned to the participant. In one embodiment, the code could be read by the mobile device 30, for example optically such as by reading a bar code. In another embodiment, the participant code could be entered into the mobile device manually. Reading of the participant code retrieves the registered participant details from the database 24. The volunteer then uses the mobile device 30 to assign an RFID chip and/or participant number to the participant. Assignment of the RFID chip can occur using the mobile device to read, as described above, the unique chip identifier of the RFID chip to be assigned to the participant which is then stored in the participant details in the database 24. The participant number on the bib may also be read using the mobile device 30 or manually entered and assigned to the participant by storing in the participant's information in the database 24.

Once the RFID chip and/or participant number are assigned to the participant, the RFID chip and/or participant number are then given to the participant or designated representative at 70.

The concepts described herein can be used in any event for which an RFID chip and/or a participant number is to be assigned and issued to a registered participant.

The concepts described herein can also be used in any application where an individual pre-registers for an activity online, and the individual is then assigned a unique identifier in real-time when the individual shows up at a designated location after registering.

In some embodiments, the concepts described herein can be utilized with other devices that are commonly carried by the preregistered individual. Instead of assigning an RFID chip to the preregistered individual, a mobile phone, a smart watch, or other item carried by the preregistered individual that has communication capability can be assigned to the preregistered individual in real-time at a designated location, such as the location where RFID chips are also being assigned. A mobile device, or a reader connected to or physically integrated into a mobile device, at the designated location reads a unique identifier of the mobile phone, smart watch, or other device, and then associates that unique identifier with the individual's registration details. The individual then carries the device during the event, with the device functioning generally similarly to an RFID chip by allowing the individual's location in the event to be tracked via the device.

Although a number of methods and systems are described herein, it is contemplated that a single system or method can include more than one of the above discussed subject matter. Accordingly, multiple of the above systems and methods can be used together in a single system or method.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A method comprising:
   providing access to a website that permits registration for an event for which a participant number and/or an RFID chip will be issued to each registered participant;
   allowing registration for the event via the website, with each registrant being a registered participant;
   for each registered participant, storing registration details of the registered participant in a database;

assigning and issuing a unique participant code to each registered participant;

after registration, at a designated pick-up location for the registered participants to pick-up their participant number and/or RFID chip, using the unique participant code, registered participant's name or other information to retrieve the registration details for one of the registered participants from the database using a mobile device while the one registered participant or a designated representative thereof is present;

at the designated pick-up location, manually entering the participant number and/or a chip identifier of an RFID chip into the mobile device using a keypad of the mobile device, or reading data directly from the RFID chip, to assign the participant number and/or the RFID chip to the one registered participant while the one registered participant or the designated representative thereof is present; and issuing the participant number and/or the RFID chip to the one registered participant or to the designated representative.

2. The method of claim 1, comprising manually entering the participant number.

3. The method of claim 2, wherein the participant number is disposed on a bib.

4. The method of claim 3, wherein the RFID chip is separate from the bib or attached to the bib.

5. The method of claim 1, comprising manually entering the chip identifier.

6. The method of claim 1, comprising manually entering the participant number and the chip identifier.

7. The method of claim 1, comprising reading data directly from the RFID chip using a reader that is wirelessly connected to, or connected by one or more wires to, the mobile device or that is physically integrated into the mobile device.

* * * * *